United States Patent [19]

Evans

[11] Patent Number: 4,847,952
[45] Date of Patent: Jul. 18, 1989

[54] PRODUCT DISCHARGE TRAY MECHANISM

[75] Inventor: Alfred J. Evans, Raleigh, N.C.

[73] Assignee: Delaware Capital Formation, Inc., Apex, N.C.

[21] Appl. No.: 251,668

[22] Filed: Sep. 29, 1988

[51] Int. Cl.$^4$ .............................................. A22C 11/02
[52] U.S. Cl. .......................................... 17/35; 17/33; 17/41
[58] Field of Search ............... 17/35, 41, 33, 38, 49, 17/1 F, 42, 24; 426/140, 284; 414/737, 744.8, 69

[56] References Cited

U.S. PATENT DOCUMENTS

| Re. 30,390 | 9/1980 | Kupcikevicius et al. | 17/41 |
| 4,142,273 | 3/1979 | Gay | 17/41 |
| 4,322,871 | 4/1982 | Townsend et al. | 17/34 |

Primary Examiner—Willis Little
Attorney, Agent, or Firm—Allegretti & Witcoff, Ltd.

[57] ABSTRACT

In a food product stuffing machine, a product discharge tray is mounted on a parallelogram linkage and inclined against a vertical guide. A rotary actuator drives the linkage to drive the tray forward, horizontally, and laterally, horizontally. Simultaneously the tray climbs the vertical guide, discharging product by gravity, forward of the machine and at approximately the same product height and lateral position as before contact with the tray.

19 Claims, 6 Drawing Sheets

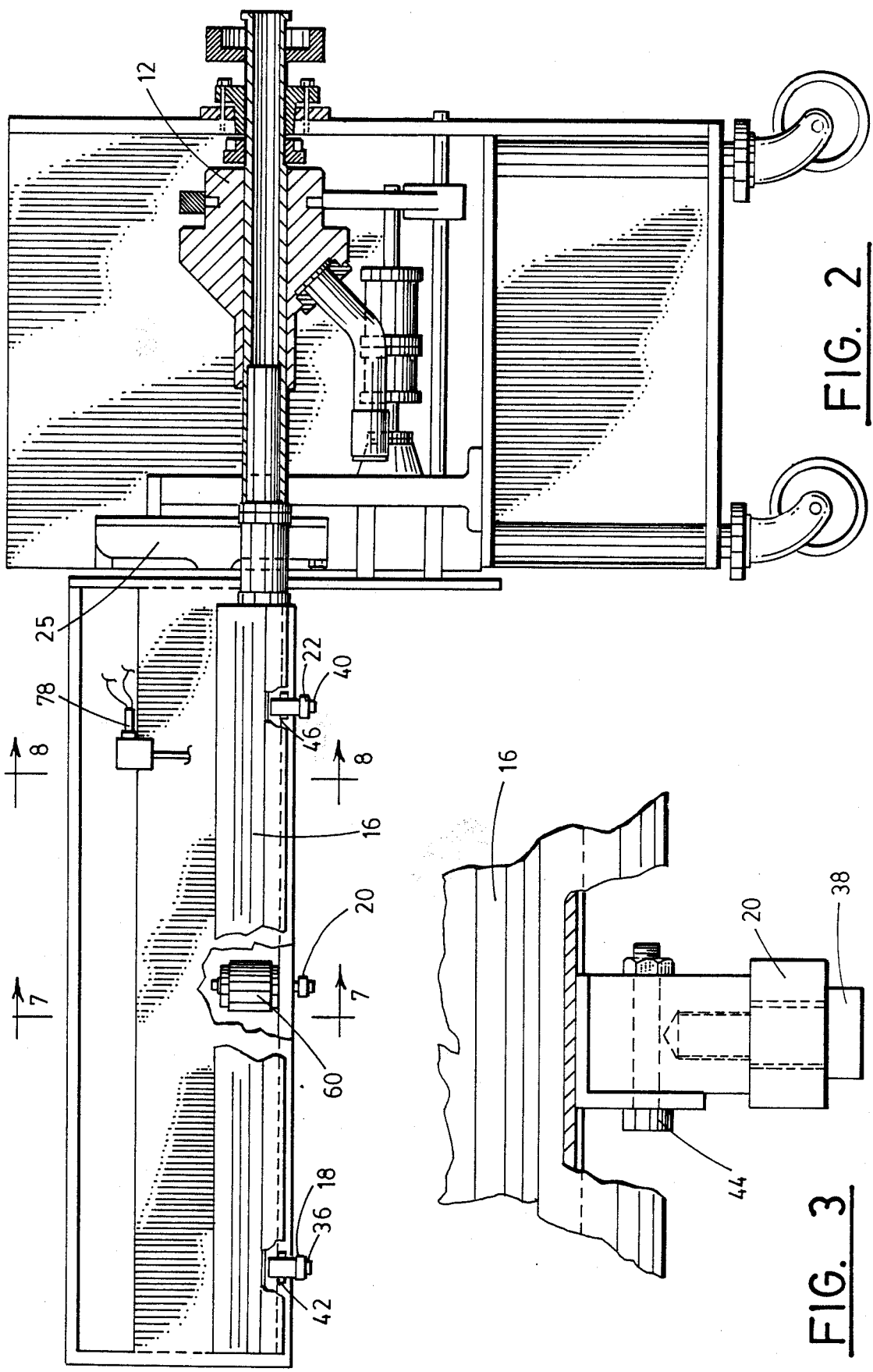

PRODUCT DISCHARGE TRAY MECHANISM

BACKGROUND OF THE INVENTION

This invention relates to stuffing machines of the type which make sausages and similar stuffed meat and stuffed food products, and more particularly to discharge trays for such machines.

Sausage making and the making of similar stuffed meat and stuffed food products have become highly automated. As a result of significant, valuable research in the United States, a variety of machines have been successfully developed for the automated production of stuffed meat products. One such machine is disclosed in U.S. Pat. No. 4,142,273 issued Mar. 6, 1979 to Robert W. Gay and assigned to Rheem Manufacturing Company, New York, N.Y. In a machine such as that disclosed in the identified patent, comminuted sausage material is pumped from a vat to a stuffing horn assembly. Shirred casing is applied over the end of a stuffing horn of the assembly, and after the horn with the casing is indexed into position, the sausage material is pumped through the horn. The sausage material and casing leave the horn simultaneously, through a casing brake, with the sausage material filling the casing. A clipper mechanism intermittently voids and clips the stuffed casing, to define the end of an exiting sausage product and the beginning of the next product. The exiting product exits onto a discharge tray, from which the product is dropped to a conveyor line or for manual handling. Discharge occurs by a rolling, downward and lateral discharge to a level below the machine working height.

While the discharge tray of the identified patent has been and is desirable, significant opportunity has existed for improvement. Factors impacting discharge tray design include, among others, the need to receive product in the location where it exits the stuffing horn, the need to discharge the product to a desirable location, the need to avoid engagement with the clipping mechanism, the need to receive product of a variety of diameters and lengths, the need to handle the product without damage, and the need to accomplish discharge with a mechanism which is not complex, not expensive of energy, and not expensive of manufacture.

SUMMARY OF THE INVENTION

In a principal aspect, the invention constitutes an improved product discharge tray for a stuffing machine which satisfies the needs of such a device uniquely, in a minimum of space, and with benefits and advantages not previously attainable. A full understanding and appreciation of the invention and its objects, benefits and advantages is best obtained by a full appreciation of the invention in the context of the art.

In summary, the invention includes a discharge tray, a mechanical linkage supporting and directing movement of the tray, a powered actuator mechanism driving the mechanical linkage, and a product recognition mechanism for initiating action of the actuator mechanism. Under power of the actuator mechanism, the discharge tray is directed by the mechanical linkage in a bidirectional motion, e.g., in (a) the direction of discharge, and simultaneously in (b) a direction transverse to the direction of discharge. While the tray is moving, a leading edge of the discharge tray climbs an adjacent guide mechanism. The tray tilts. Product on the tray is moved away from the stuffing horn, permitting rapid continuation of stuffing, and yet discharged after minimal, gentle movement in an orientation collinear with the discharge axis of the horn, substantially at the same heights as the discharge axis of the horn.

As preferred, and as will be described in detail, the mechanical linkage preferably comprises a parallelogram linkage. Also as preferred, the actuator mechanism comprises a rotary actuator driving a middle link of the parallelogram linkage at a vertical-axis pivot connection, and the tray is mounted to the links of the linkage for pivoting about horizontal-axis pivot connections. Recognition of product by the product recognition mechanism causes the rotary actuator to initiate; the actuator then cycles the mechanical linkage and tray through discharge, and a return to starting positions.

BRIEF DESCRIPTION OF THE DRAWING

The preferred embodiment of the invention is described in the following section, in relation to the accompanying drawing. For orientation of the reader to the drawing, and ease of beginning of reading of the following section, the following is a brief description of the figures of the drawing:

FIG. 2 is a side elevation view of the machine of FIG. 1, including the preferred product tray to the left in FIG. 2, with portions sectioned and additional portions broken away to reveal internal detail;

FIG. 3 is a detail, side elevation view of one of the mountings of the discharge tray to the mechanical linkage;

DETAILED DESCRIPTION OF THE PREFERRED EMBODIMENT

Figure 1:
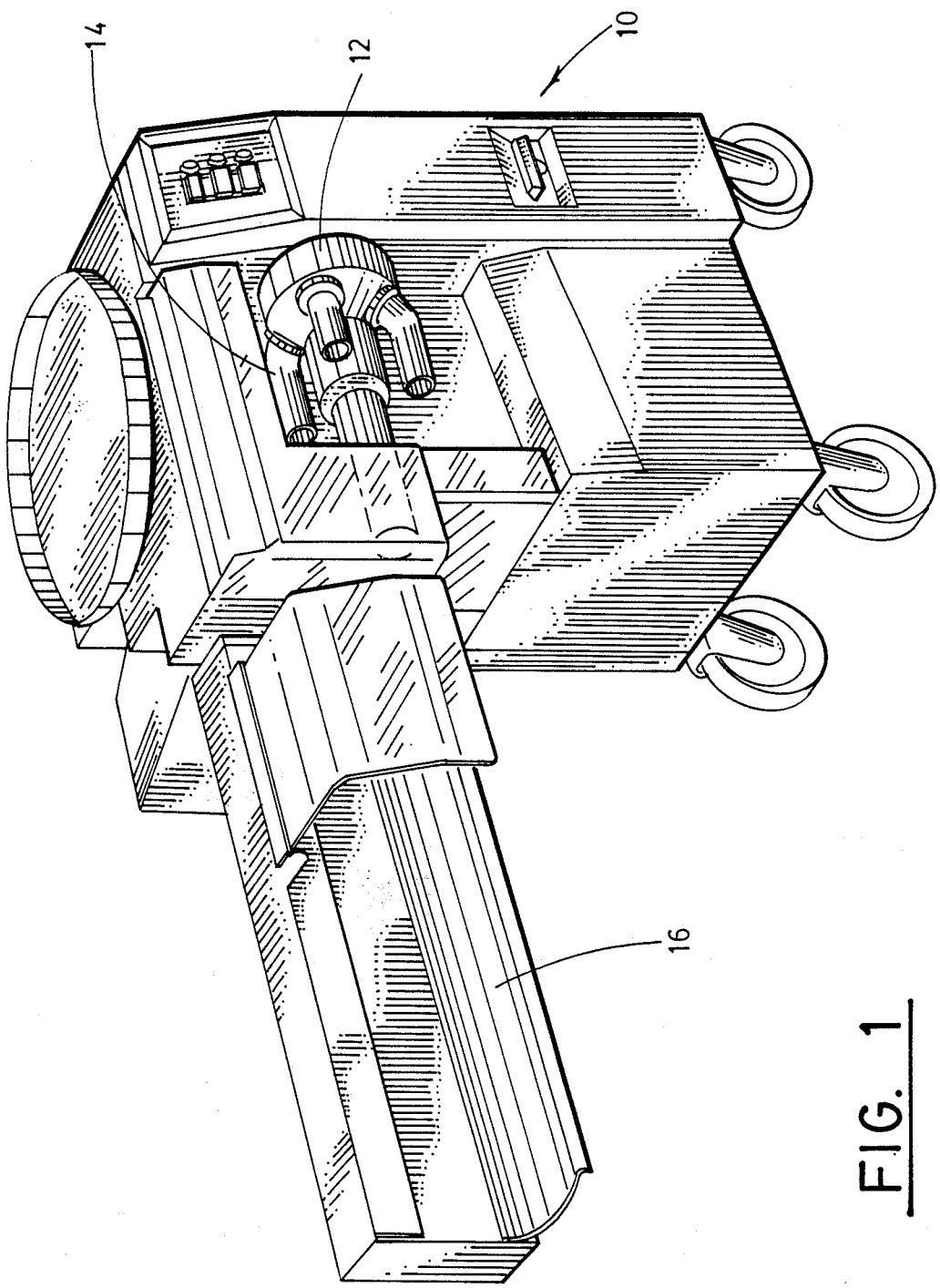
FIG. 1 is an overall perspective view of a machine which incorporates the preferred embodiment of the invention.

Referring to FIG. 1, the preferred embodiment of the invention is an improved discharge tray mechanism for a stuffing machine generally designated 10, a pneumatic power source, and an electrical power source such as 110 volt line power. As in FIG. 1, the stuffing machine 10 is a refined device, having a stuffing horn turret assembly 12 including multiple stuffing horns. The machine 10 also incorporates a variety of refinements, from semi-automatic operation through control logic and circuitry to extreme mobility. The machine produces stuffed products at high rates for its size and simplicity.

Figure 4:
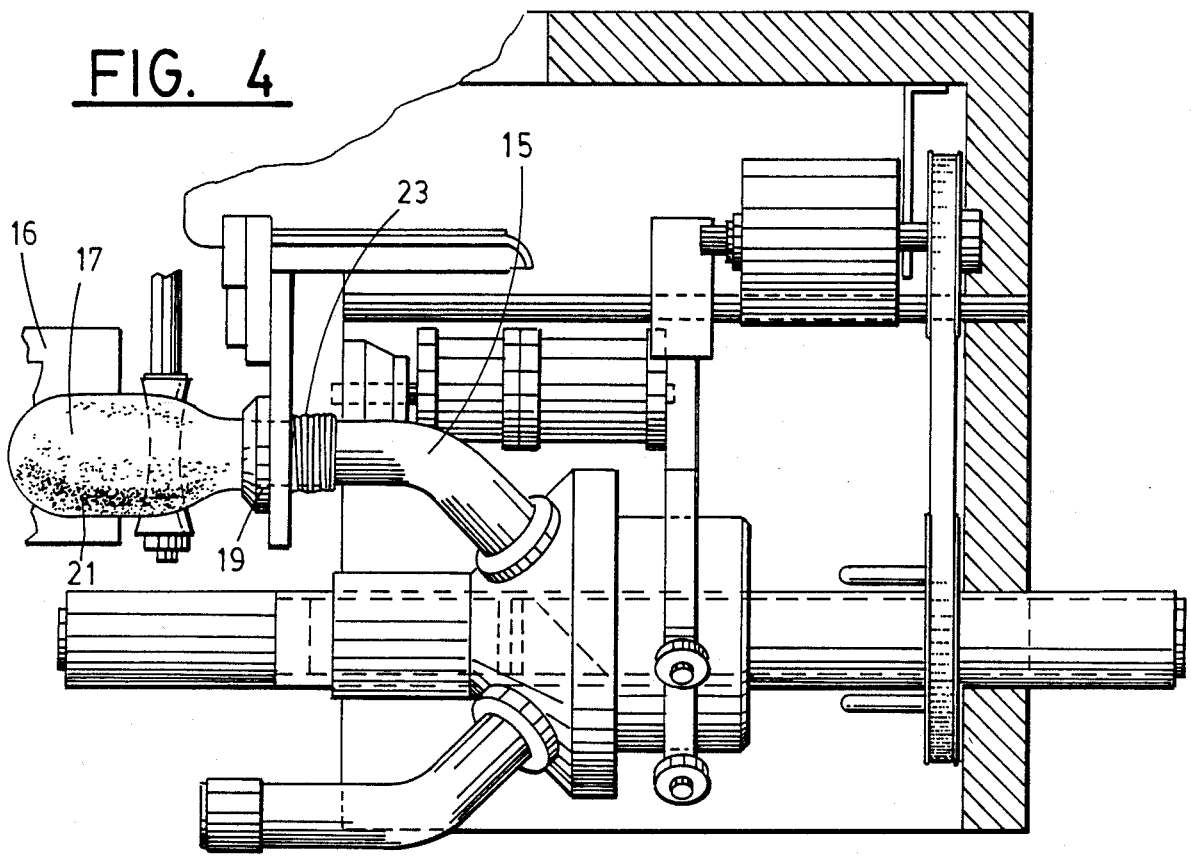
FIG. 4 is a partially sectioned, plan view of a portion of the machine of FIG. 1.

A frame of the machine 10 is mounted atop wheels, and supports a variety of internal mechanisms and the stuffing horn turret assembly 12. Each stuffing horn has a discharge end, all of which extend in a single direction (to the left in FIGS. 1, 2, 4). The turret assembly 12 indexes the stuffing horns rotationally, such that the horns sequence into the position of horn 14 in FIG. 1. The turret assembly 12 also indexes the horns axially, such that the horns sequence into the stuffing position of horn 15 in FIG. 4. Referring to a horn in stuffing position, as is horn 15 in FIG. 4, the horn defines a discharge direction, which is the direction of movement of product 17 during stuffing. The stuffing horn further defines a substantially horizontal discharge axis centered along the discharge end of the stuffing horn and extending in the discharge direction.

The stuffing horns cooperate with a skin brake 19 (FIG. 4) to discharge a product 17 of communited material 21 such as meat surrounded by a skin or casing 23. A clipper apparatus 25 (FIG. 2) intermittently voids material from a casing segment adjacent the break, and clips ends, to define beginnings and ends of products. An idler roller 27 (FIGS. 5–8) eases product movement adjacent the clipper.

In such a machine, the preferred, improved discharge tray mechanism includes a product discharge tray 16, best seen in FIG. 1. The tray 16 is elongated in the discharge direction and curved in the direction transverse to the discharge direction (hereafter "the transverse direction").

Figure 5:
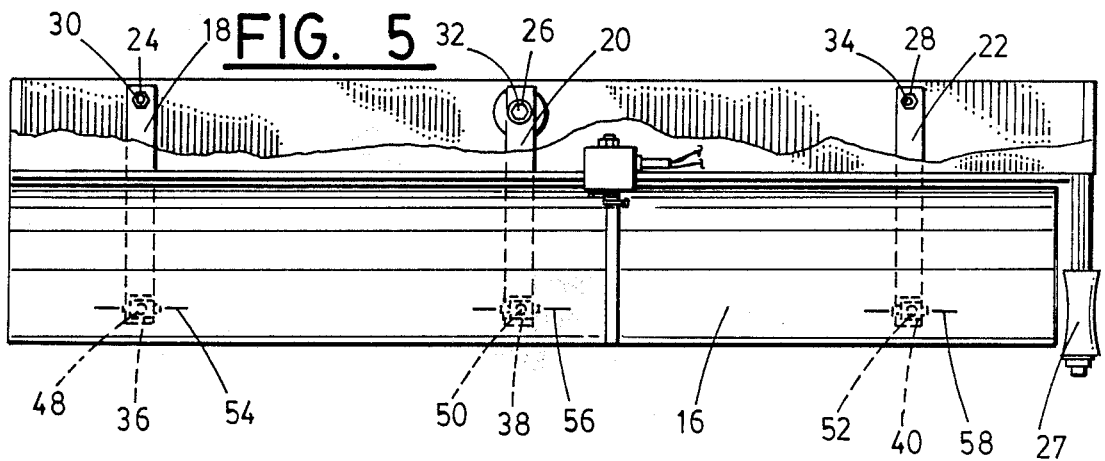
FIG. 5 is a plan view of the discharge tray of FIG. 2 in a starting or product receiving state of operation.
Figure 6:
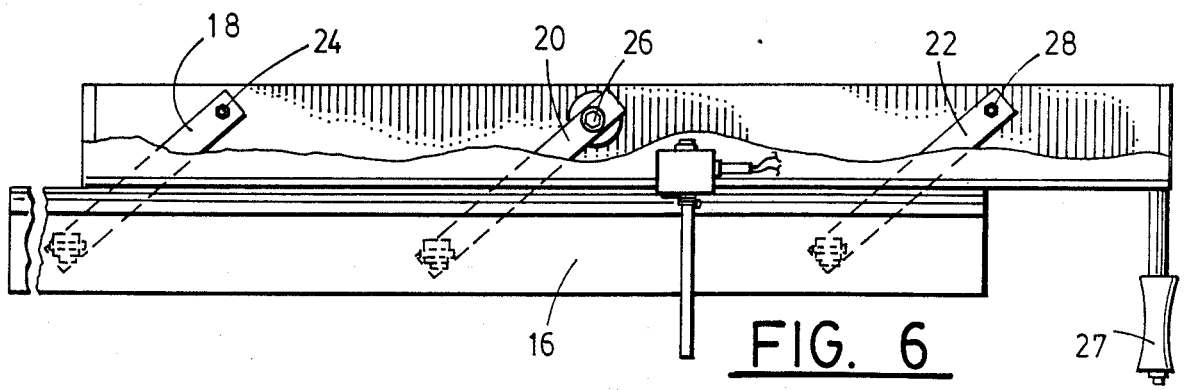
FIG. 6 is a plan view of the discharge tray, in a discharging state of operation.
Figure 7:
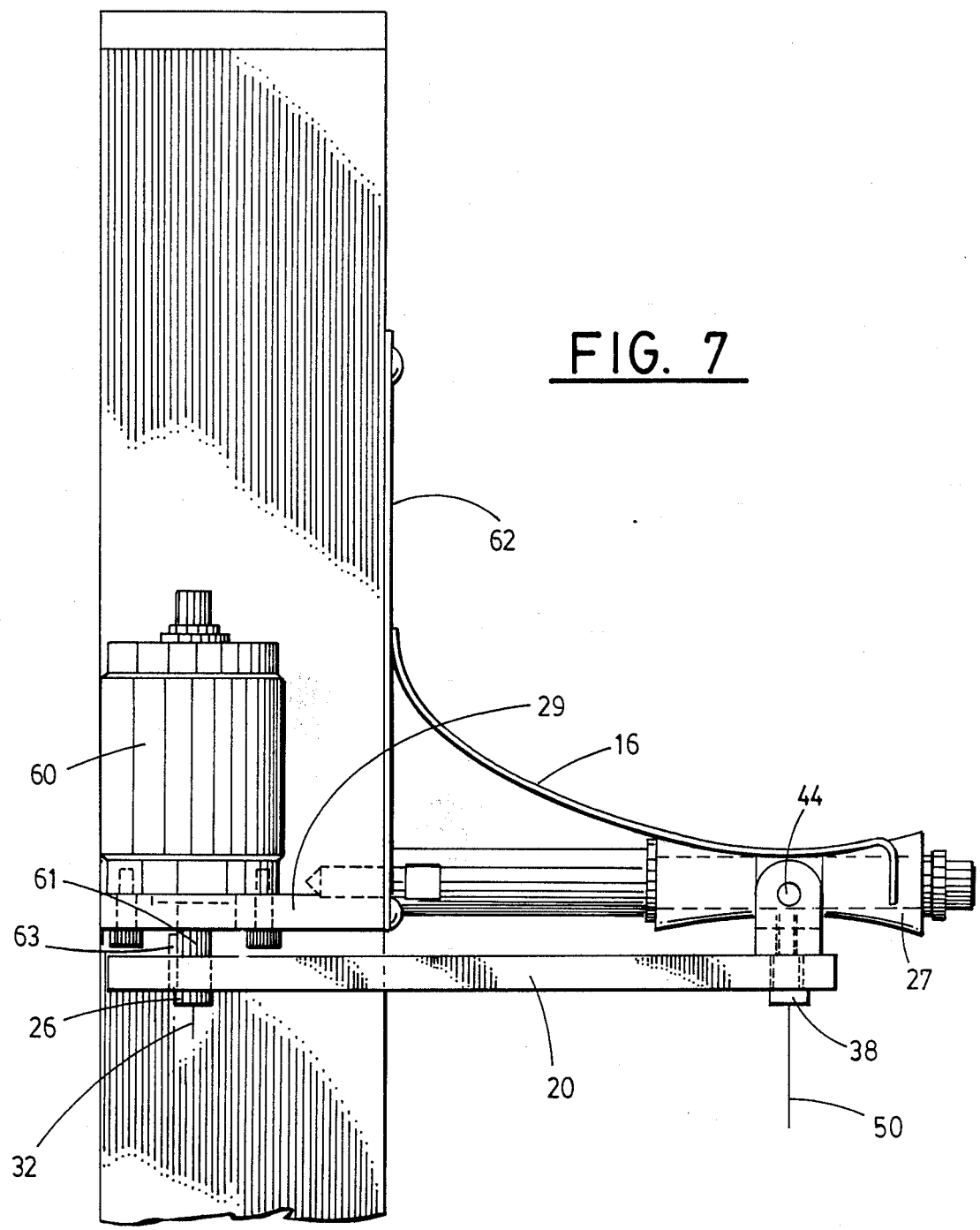
FIG. 7 is an elevational section view of the preferred discharge tray, transverse to the side elevation view of FIG. 2, taken along line 7—7 in FIG. 2, with the tray in the starting position.

Referring to FIGS. 5 and 6, multiple, parallel, equilength mechanical links 18 and 22 are mounted to a tray frame compression member 29 (FIGS. 7, 8) by first pivots 24 and 28. Mechanical link 20 is attached to a rotary actuator output shaft 61 (FIG. 7) and keyed to output shaft 61 by an output shaft key 63 (FIG. 7). The output shaft 26 constitutes a first pivot axis 26 for mechanical link 20 (FIGS. 5, 6 and 7).

The first pivots 24, 26, 28 mount the links 18, 20, 22 to the frame for pivoting about substantially vertical and stationary first pivot axes 30, 32, 34 (FIG. 5). The first pivot axes 30, 32, 34 are aligned in the discharge direction parallel to the discharge axis.

Figure 8:
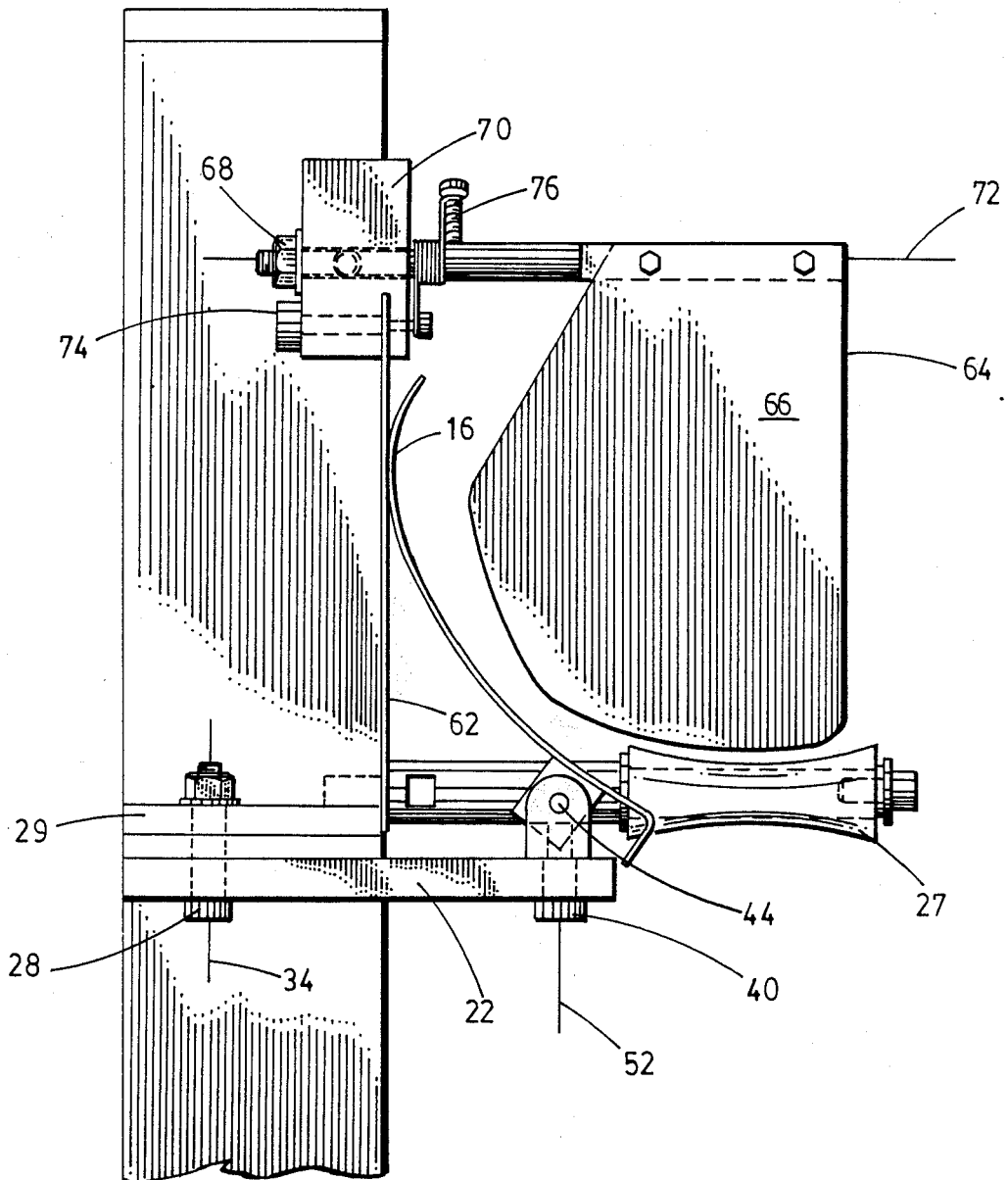
FIG. 8 is an elevational section view similar to FIG. 7, taken along line 8—8 in FIG. 2, with the tray in the discharging position.

Second pivots 36, 38, 40 (FIGS. 2, 3, 5, 7, 8) are mounted to the links 18, 20, 22 opposite the first pivots 24, 26, 28, e.g., at the ends of the links opposite the first pivots, for mounting of third pivots 42, 44, 46 (Figs. 2, 3, 7, 8) about substantially vertical second pivot axes 48, 50, 52 (FIGS. 5, 7, 8). The second pivot axes 48, 50, 52 are not stationary, but movable, and aligned in the discharge direction parallel to the discharge axis.

The third pivots 42, 44, 46 are mounted to the second pivots 36, 38, 40, and mount the product discharge tray 16 to the second pivots. The third pivots thereby mount the product discharge tray 16 to the mechanical links 18, 20, 22. Mounting is about substantial horizontal, moving third pivot axes 54, 56, 58, shown in FIG. 5.

As the consequence of the mounting, the product discharge tray 16 is movable about the first pivots 24, 26, 28 and simultaneously movable about the third pivots 42, 44, 46, for bidirectional motion, e.g., (a) simultaneous horizontal motion in (i) the discharge direction and (ii) the transverse direction and (b) simultaneous vertical, tilting movement.

A pneumatic rotary actuator 60 (FIGS. 2, 7) is mounted on the tray frame compression member 29. The actuator 60 drives the actuator shaft 61 which forms the first pivot 26, for driving the mechanical links and the product discharge tray 16 about the first pivots between a product receiving location and a product discharging location. The product receiving position is shown best in FIGS. 4, 5 and 7. The product discharging location is shown best in FIGS. 6 and 8. As seen by comparing the identified figures, the product discharging location is more remote from the product discharge end of the stuffing horn 14 than the product receiving location, in the discharging direction. Also, the product discharging location is more remote from the discharge axis than the product receiving location, in the transverse direction. Further, the product discharging location is closer a tilt guide (and guard) 62 than the product receiving location, the the transverse direction.

The mentioned tilt guide/guard 62 is a static member mounted on the tray frame compression member 29. The tilt guide/guard 62 is elongated in the discharge direction and extends vertically adjacent the discharge axis. The tilt guide/guard 62 is located in relation to the product discharge tray 16 so as to be contacted by the product discharge tray 16 under the force of gravity, while the product discharge tray 16 is in the product receiving location, and in the product discharging location, and at all locations of the product discharge tray therebetween. The product discharge tray 16 is tilted at an angle, as in FIG. 8, sufficient to cause product to roll from the product discharge tray under the force of gravity while the product discharge tray is in the product discharging position. The product discharge tray 16 is positioned, as in FIG. 7, to maintain product thereon while the product discharge tray is in the product receiving position.

Referring to FIG. 8, a product recognition paddle 64 includes a paddle face 66 elongated in the transverse direction, and a fourth pivot 68 mounts the product recognition paddle to a mounting block 70 in the path of product exiting the stuffing horn 15. The paddle 64 is mounted about a substantially horizontal, transverse fourth pivot axis 72 for movement of the paddle upward and along the discharge direction about the fourth pivot axis 72 under the force of product exiting the stuffing horn. (FIG. 8 depicts the paddle in static position only.)

The mounting block 70 mounts on the tilt guide/guard 62, to the tray frame for movement along the discharge direction. This mounting provides for variable placement of the product recognition paddle 64 along the discharge direction. A releasable fastener 74 releasably fastens the mounting block 70 on the tilt guide/guard 62 to the tray frame.

A spring 76 is located between the product recognition paddle 64 and the mounting block 70. The spring 76 biases the paddle 64 in position to be contacted by product.

An electrical switch 78 (FIG. 2) is mounted to the mounting block 70 adjacent the product recognition paddle 64. The switch 78 is tripped by the product recognition paddle 64 upon pivoting of the product recognition paddle, under the action of product exiting the stuffing horn 14. The electrical switch 78 is connected to the rotary actuator 60 via the control circuit for supplying power from a power source to the rotary actuator.

Product exiting the stuffing horn is received by the product discharge tray in the product receiving position. The product recognition paddle can be positioned to recognize finished product of desired length exiting the stuffing horn. In operation of the preferred product discharge tray mechanism, finished product exit the stuffing horn, the casing break, and contacts the product recognition paddle. This contact causes the paddle 64 to rotate about fourth pivot axis 72. Pivoting of paddle 72, in turn, actuates the electrical switch 78. Actuation of the electrical switch provides an input to control logic which stops flow of product. The clipper then voids and clips the product. Once these actions are complete, the clipper opens, and the horn retracts from the product just clipped. Once these actions are complete the control logic directs the power circuit to power the rotary actuatory and initiates the discharge motion.

Figure 9:
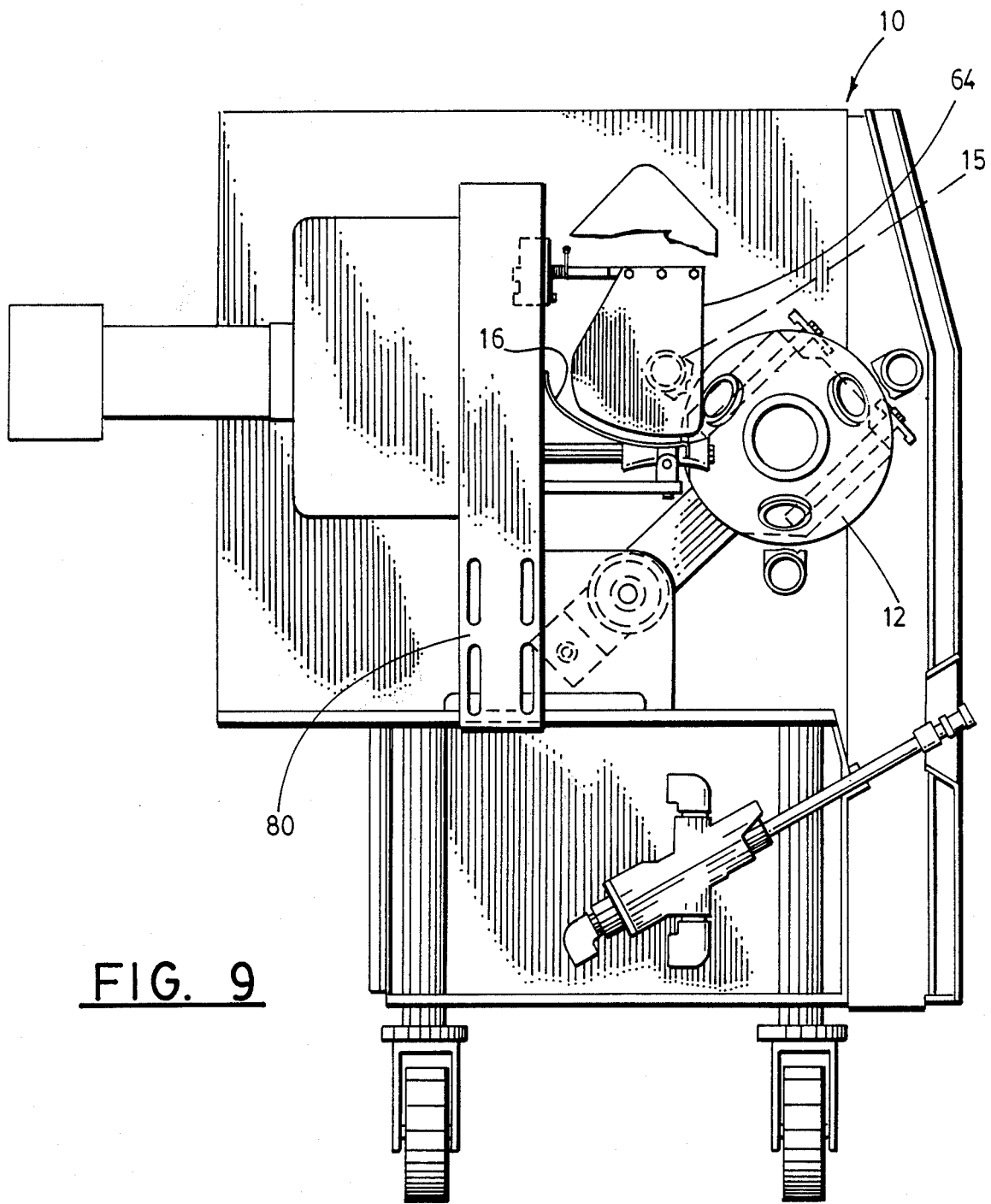
FIG. 9 is an end elevational view of the machine, from the left of FIG. 2.

The product discharge tray is thereby moved to the product discharge position. As shown in FIG. 9, vertical adjustment of the tray through bracket 80 permits adjustment to produce size. Thus, in the product discharge position of the product discharge tray, the finished product is discharged away from the stuffing horn (in the discharge direction), and at substantially the same position (in the transverse and vertical directions) as the product previously occupied while the tray was in the receiving position.

What is claimed is:

1. An improved discharge tray mechanism for a stuffing machine comprising:
   a product discharge tray;
   means for mounting the product discharge tray, the mounting means including,
      means for moving the product discharge tray bidirectionally, and
      means for tilting the product discharge tray vertically while moved by the moving means,
   the moving means and the tilting means cooperatively causing the product discharge tray to move between a product receiving position and a product discharging position; and
   means, operatively associated with the mounting means, for driving the moving means.

2. An improved discharge tray mechanism as in claim 1 further comprising means for recognizing product in need of discharge and initiating action of the driving means.

3. An improved discharge tray mechanism as in claim 1, the driving means constituting means for driving the moving means through a cycle from the product receiving position through the product discharging position to the product receiving position.

4. An improved discharge tray mechanism as in claim 1 in which the moving means includes mechanical linkage connected to the product discharge tray.

5. An improved discharge tray mechanism is in claim 4 in which the driving means drives the mechanical linkage.

6. An improved discharge tray mechanism as in claim 4 in which the mechanical linkage includes a parallelogram linkage.

7. An improved discharge tray mechanism as in claim 6 in which the driving means is operatively connected to and drives the parallelogram linkage.

8. An improved discharge tray mechanism as in claim 6 in which the product discharge tray forms a portion of the parallelogram linkage.

9. An improved discharge tray mechanism as in claim 6 in which the parallelogram linkage includes at least two parallel links, at least one of the links being a driving link.

10. An improved discharge tray mechanism as in claim 9 in which the driving means includes a rotary actuator operatively connected to and driving the driving link.

11. An improved discharge tray mechanism as in claim 1 in which the driving means includes a rotary actuator.

12. An improved discharge tray mechanism as in claim 1 in which the stuffing machine includes a stuffing horn having a discharge end and a substantially horizontal direction of product discharge, and in which the means for moving the product discharge tray constitutes means for moving the product discharge tray simultaneously away from the discharge end in the direction of product discharge and in a horizontal direction transverse to the direction of product discharge.

13. An improved discharge tray mechanism as in claim 1 in which the means for tilting the product discharge tray vertically while moved by the moving means constitutes means for tilting the product discharge tray vertically upward.

14. An improved discharge tray mechanism as in claim 13 in which the means for tilting the product discharge tray includes a tilt guide located adjacent the product discharge tray, the product discharge tray contacting the tilt guide and sliding along the tilt guide during movement between the product receiving position and the product discharging position.

15. An improved discharge tray mechanism as in claim 14 in which the product discharge tray is inclined at an angle against the tilt guide in the product receiving position and inclined at a higher angle against the tilt guide in the product discharging position.

16. An improved discharge tray mechanism as in claim 2 in which the recognizing means includes a product recognition member operatively mounted in relation to discharging product to be contacted by product in need of discharge and means for communicating the contact to the driving means for initiating the driving means.

17. An improved discharge tray mechanism as in claim 16 in which the product recognition member constitutes a pivotable paddle and the communicating means includes a switch operatively connected to the driving means.

18. An improved discharge tray mechanism as in claim 17 in which the switch is an electrical switch and the driving means is pneumatic driving means, the switch being operatively connected to the driving means.

19. An improved discharge tray mechanism for a stuffing machine and electrical power sources, the stuffing machine producing stuffed products and including a frame and a stuffing horn, the stuffing horn having a discharge end and defining a discharge direction, the discharge direction being collinear with the direction of movement of product during stuffing, the stuffing horn further defining a substantially horizontal discharge axis centered along the discharge end of the stuffing horn and extending in the discharge direction, the improved discharge tray mechanism comprising:
   a product discharge tray elongated in the discharge direction and curved in the direction transverse to the discharge direction (hereafter "the transverse direction");
   multiple parallel mechanical links;
   first pivots mounting the links to the stuffing machine frame for pivoting about substantially vertical first pivot axes, the first pivot axes being aligned in the discharge direction parallel to the discharge axis;
   second pivots mounted to the links opposite the first pivots for mounting of hereinafter-defined third pivots about substantially vertical second pivot axes, the second pivot axes being aligned in the discharge direction parallel to the discharge axis;

third pivots mounted to the second pivots, the third pivots mounting the product discharge tray to the second pivots and thereby the mechanical links about substantial horizontal third pivot axes;

the product discharge tray thereby being movable about the first pivots and simultaneously movable about the third pivots, for simultaneous horizontal motion in the discharge direction and the transverse direction and simultaneous vertical, tilting movement;

a rotary actuator mounted on the tray and operatively connected to a first pivot for driving the mechanical links and the product discharge tray about the first pivots between a product receiving location and a product discharging location, the product discharging location being more remote from the product discharge end of the stuffing horn than the product receiving location in the discharging direction, the product discharging location being more remote from the discharge axis than the product receiving location in the transverse direction, and the product discharging location being closer a hereinafter defined product discharge tray tilt guide than the product receiving location in the transverse direction;

a static product discharge tray tilt guide mounted on the tray frame, elongated in the discharge direction and extending vertically adjacent the discharge axis, the tilt guide located in relation to the product discharge tray so as to be contacted by the product discharge tray under the force of gravity while the product discharge tray is in the product receiving location and in the product discharging location and at all locations of the product discharge tray therebetween, the product discharge tray being tilted at an angle sufficient to cause product to roll from the product discharge tray under the force of gravity while the product discharge tray is in the product discharging position and the product discharge tray being positioned to maintain product thereon while the product discharge tray is in the product receiving position;

a product recognition paddle including a paddle face elongated in the transverse direction;

a fourth pivot mounting the product recognition paddle to a hereinafter-defined mounting block in the path of product exiting the stuffing horn about a substantially horizontal, transverse fourth pivot axis for movement of the paddle upward and along the discharge direction about the fourth pivot axis under the force of product exiting the stuffing horn;

a mounting block mounted on the tilt guide to the tray frame for movement along the discharge direction for variable placement of the product recognition paddle along the discharge direction;

a releasable fastener for releasably fastening the mounting block on the tilt guide to the stuffing machine frame;

a spring between the product recognition paddle and the mounting block which biases the product recognition paddle;

an electrical switch mounted to the stuffing machine frame adjacent the product recognition paddle, the switch being tripped by the product recognition paddle upon pivoting of the product recognition paddle under the action of product exiting the stuffing horn, the electrical switch being operatively connected to the rotary actuator for supplying power from a power source to the rotary actuator;

whereby product exiting the stuffing horn is received by the product discharge tray in the product receiving position;

whereby the product recognition paddle can be positioned to recognize finished product of desired length exiting the stuffing horn; and whereby finished product exiting the stuffing horn contacts the product recognition paddle and pivots the same, causing the rotary actuator to be initiated, and causing the product discharge tray to move to the product discharge position, in which the finished product is discharged away from the stuffing horn in the discharge direction, and at substantially the same position, in the transverse and vertical directions, as the product occupied while the tray was in the receiving position.

* * * * *